(12) United States Patent
Hundemer

(10) Patent No.: US 10,638,022 B2
(45) Date of Patent: Apr. 28, 2020

(54) MULTI-PANEL DISPLAY

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 3 days.

(21) Appl. No.: 16/125,355

(22) Filed: Sep. 7, 2018

(65) Prior Publication Data

US 2020/0084341 A1   Mar. 12, 2020

(51) Int. Cl.
| | |
|---|---|
| *H04N 5/06* | (2006.01) |
| *H04N 7/08* | (2006.01) |
| *H04N 5/04* | (2006.01) |
| *G09G 5/12* | (2006.01) |
| *G06F 3/14* | (2006.01) |

(52) U.S. Cl.
CPC ............. *H04N 5/04* (2013.01); *G06F 3/1446* (2013.01); *G09G 5/12* (2013.01); *G09G 2340/0435* (2013.01)

(58) Field of Classification Search
CPC ........... H04N 5/04; G06F 3/1446; G09G 5/12
USPC ............. 348/500, 516, 564, 383, 739, 425.4
See application file for complete search history.

(56) References Cited

U.S. PATENT DOCUMENTS

| | | | |
|---|---|---|---|
| 2010/0146505 A1 | 6/2010 | Almonte et al. | |
| 2012/0007944 A1* | 1/2012 | Eisenberg | H04N 7/152 348/14.09 |
| 2014/0201609 A1 | 7/2014 | Ryu | |
| 2015/0264293 A1* | 9/2015 | Hundemer | H04N 5/93 386/230 |
| 2016/0266861 A1 | 9/2016 | Kim | |

FOREIGN PATENT DOCUMENTS

| | | |
|---|---|---|
| JP | 2015-169758 A | 9/2015 |
| KR | 10-2009-0078111 A | 7/2009 |

OTHER PUBLICATIONS

International Search Report received for PCT Patent Application No. PCT/US2019/050015, dated Dec. 26, 2019, 3 pages.
Written Opinion received for PCT Patent Application No. PCT/US2019/050015, dated Dec. 26, 2019, 3 pages.

* cited by examiner

*Primary Examiner* — Jefferey F Harold
*Assistant Examiner* — Jean W Desir
(74) *Attorney, Agent, or Firm* — McDonnell Boehnen Hulbert & Berghoff LLP

(57) ABSTRACT

Disclosed herein are methods and systems for displaying content on a displayable area that spans multiple panels of a multi-panel display. A method includes: (a) using a genlock signal to define a periodic write interval and a periodic output interval, and (b) during at least a portion of the periodic write interval, using a markup document to store a description of a frame of video content to a data storage unit, where the video content comprises first live video content represented by a first video stream. The also method includes: (c) during a portion of the periodic output interval using (i) the stored description of the frame, and (ii) the first video stream to display the frame on the displayable area. Further, the method includes (d) repeating operations (a) and (b) for one or more other frames of the video content to display the video content on the displayable area.

20 Claims, 10 Drawing Sheets

MULTI-PANEL DISPLAY

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method of displaying video content on a displayable area that spans multiple panels of a multi-panel display is disclosed. The method includes (a) using a genlock signal to define a periodic write interval and a periodic output interval; (b) during at least a portion of the periodic write interval, using a markup document to store a description of a first portion and a second portion of a frame of the video content to a data storage unit; (c) during at least a portion of the periodic output interval, (i) receiving from a media server, the first portion of the frame of the video content, and (ii) using at least the received first portion of the frame and the stored description of the second portion of the frame to display the frame on the displayable area; and (d) repeating operations (a) and (b) for at least one or more other frames of the video content to display the video content on the displayable area.

In another aspect, an example video wall system (VWS) is disclosed. The system includes a multi-panel display that includes a plurality of display panels. The system also includes a data storage unit and a controller having one or more processors and memory storing instructions that, when executed by the one or more processors, cause the system to carry out operations including: (a) using a genlock signal to define a periodic write interval and a periodic output interval; (b) during at least a portion of the periodic write interval, using a markup document to store a description of a first portion and a second portion of a frame of video content to the data storage unit; (c) during at least a portion of the periodic output interval, (i) receiving from a media server, the first portion of the frame of the video content, and (ii) using at least the received first portion of the frame and the stored description of the second portion of the frame to display the frame on the displayable area; and (d) repeating operations (a) and (b) for at least one or more other frames of the video content to display the video content on the displayable area.

In another aspect, an example non-transitory computer-readable storage medium is disclosed. The non-transitory computer-readable storage medium having stored thereon program instructions that when executed by a processor cause performance of a set of acts including: (a) using a genlock signal to define a periodic write interval and a periodic output interval; (b) during at least a portion of the periodic write interval, using a markup document to store a description of a first portion and a second portion of a frame of video content to a data storage unit, wherein a multi-panel display is configured to display the video content, and wherein the multi-panel display comprises a displayable area that spans multiple display panels; (c) during at least a portion of the periodic output interval, (i) receiving from a media server, the first portion of the frame of the video content, and (ii) using at least the received first portion of the frame and the stored description of the second portion of the frame to display the frame on the displayable area; and (d) repeating operations (a) and (b) for at least one or more other frames of the video content to display the video content on the displayable area.

DETAILED DESCRIPTION

I. Overview

Figure 1:
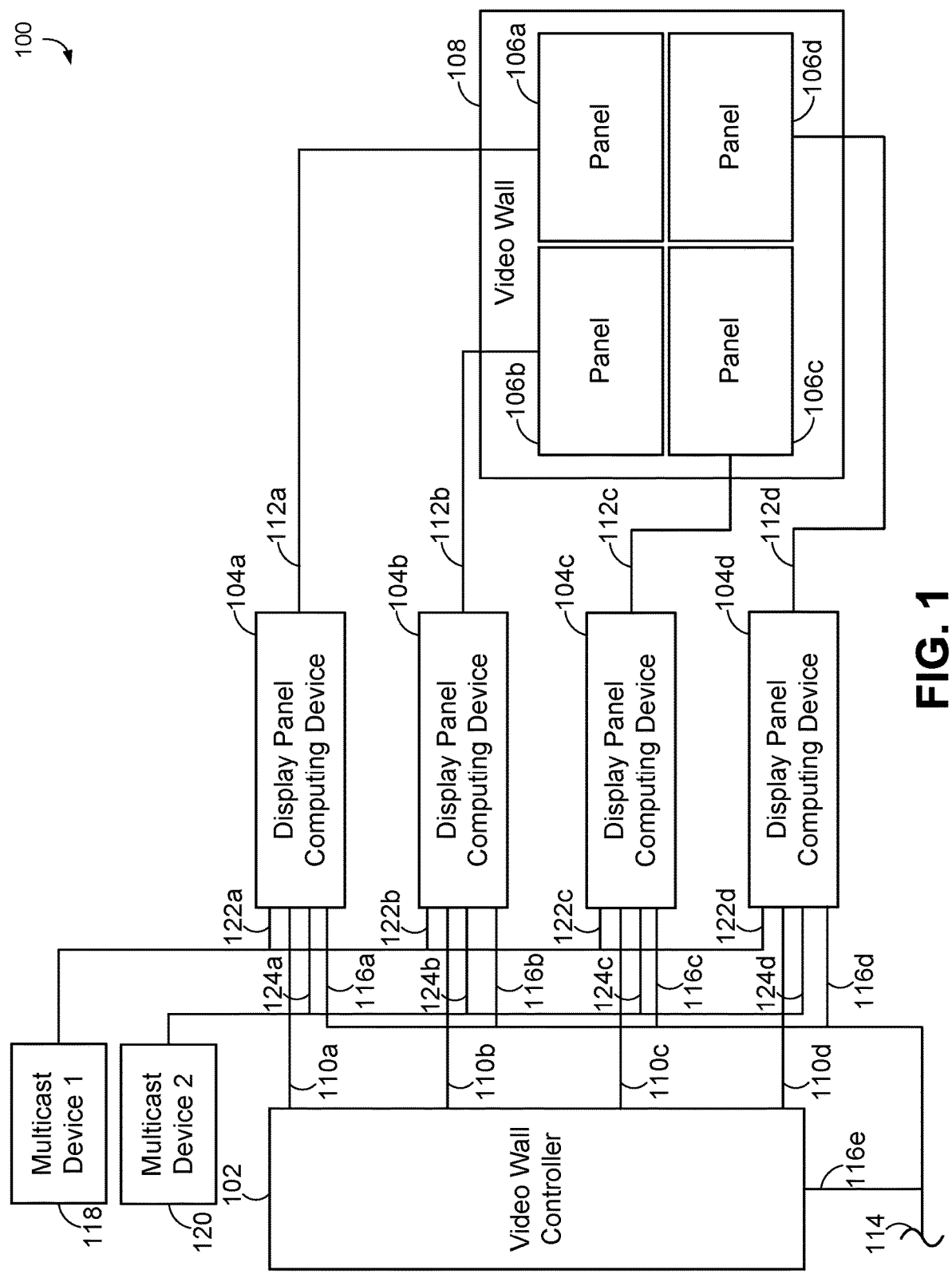
FIG. 1 is a simplified diagram of an example video wall system.

In various scenarios, it is desirable to display media content (e.g., video content, image content, etc.) on a large display, perhaps so that many people could simultaneously view the content. In one approach, the large display can be implemented using a single display panel. However, due to certain limitations of display panels, using a single display panel to display media content can become increasingly difficult and/or expensive as the desired display size increases.

Another way to achieve a large display is to use a video wall that includes multiple smaller display panels that are arranged in such a manner to give the impression of a large continuous display. Such an arrangement provides greater affordability and scalability than can be achieved using a single large display panel. Additionally, using multiple display panels increases the effective resolution of the assembled composite display because the number of individual pixels in the resulting composite display is generally greater, for a given total display area, than possible with a comparable single display panel.

The display panels can have thin bezels to decrease any separation between adjacent panels so that the composite display can appear to be contiguous across the display panels. The display panels can also be arranged in a variety of numbers, shapes, orientations, and sizes to create a custom display. The display panels can also be arranged in several groups interspaced by gaps, perhaps to create an artistic feature in the composite display.

A video wall can display media content on a displayable area (also referred to herein as a "video canvas") formed by the displays of the display panels. In particular, the video wall can display content synchronously on any portion of the video canvas, including portions of the video canvas that span multiple display panels. In scenarios where the video wall includes several groups of display panels, the video wall can display content synchronously across the groups of display panels, perhaps to create an effect that spans over a larger physical area.

A video wall can be controlled or configured using a video wall controller or processor. Currently, video wall controllers come in the form of specialized devices that are directly connected to the display panels in order to control the video wall. However, such specialized devices are expensive, which can make installing a video wall a costly endeavor. Also, video walls that are controlled by some of these specialized devices can suffer from video artifacts such as low resolution (e.g., due to upscaling content) and screen tearing (e.g., due to out-of-sync content being displayed on different display panels). Such video artifacts are particularly noticeable when an object is displayed across multiple display panels or is moving across multiple display panels.

Disclosed herein are systems and methods for displaying content on a video wall in an improved, cost-efficient, and reliable manner. In an example implementation, a video wall system may include a plurality of display panels that are arranged to form a video wall. The system may also include a video wall controller that can control and/or configure the video wall. The controller can be connectively coupled to each display panel, perhaps through a respective display panel computing device coupled to each display panel. In this arrangement, the system can perform methods to output content synchronously and reliably on the video wall.

The video wall controller can receive inputs indicative of a desired output for display on the video wall. For example, the input may take the form of a markup document that programmatically describes the desired output. The desired output may include live video content and/or pre-recorded video content. In an embodiment, the controller may iteratively interpret the markup document to determine the desired output on a frame-by-frame basis. In each iteration, interpreting the markup document may result in data vectors that describe a frame of the desired output.

In an embodiment, the data vectors that correspond to the pre-recorded content may describe pixels of the pre-recorded content of the frame. For example, the data vectors may include a respective RGB value of each pixel of the pre-recorded content. On the other hand, the data vectors that correspond to the live content may describe the live content by reference. For example, the data vectors may describe the live content by identifying a video source of the live content (e.g., a media server), a layer level of the live content, and/or a desired layout of the live content in the desired output.

After interpreting the markup document to determine the data vectors that describe a frame of the desired output, the controller may provide the data vectors to the display panel computing devices by rendering the data vectors to memory that can be accessed by the display panel computing devices. The display panel computing devices may use the data vectors to display the frame of the video content on the video wall.

To do so, the display panel computing devices may access the data vectors and a space descriptor document that describes a layout of the display panels in physical space. The display panel computing devices may use the data vectors and the space descriptor document to cause the display panels to display the frame on the displayable area of the display panels. In particular, each display panel computing device may use the space descriptor document to determine a respective portion of the frame for display on the respective display panel coupled to the display panel computing device. Each display panel computing device may determine a respective subset of data vectors that describes the respective portion of the frame for display by the respective display panel. Each display panel computing device may read the respective subset of data vectors to determine the description of the respective portion of the frame for display by the respective display panel.

When reading the respective subset of data vectors, a display panel computing device may read the data vectors that describe the pre-recorded video content. By reading these data vectors, the display panel computing device may determine the description of the pre-recorded video content (e.g., RGB values of the pixels of the pre-recorded content). The display panel computing device may use the description of the pre-recorded video content to cause the respective display panel coupled to the computing device to display the pre-recorded video content. Additionally, when reading the respective subset of data vectors, the display panel computing device may read data vectors that describe the live video content. By reading these data vectors, the display panel computing device may determine the description of the live video content (e.g., an identifier of a source of the video content). The display panel computing device may use the description of the live video content to receive, from a video source, a video stream that represents the live video content. The display panel computing device may use the video stream to cause the respective display panel to display the live content.

Once the display panels have displayed the frame of the video content, the process may be repeated for one or more other frames of the desired output. That is, the video wall controller may iteratively determine the data vectors that describe the desired output. In each iteration, the controller may determine the data vectors that describe a frame of the desired content. Iteratively determining the data vectors may allow the video wall controller to cause the display panels to display the desired output frame-by-frame reliably and synchronously.

II. Example Video Wall System

FIG. 1 is a simplified block diagram of an example video wall system (VWS) 100. The VWS 100 may be configured to perform a variety of functions related to displaying video content on a video wall 108 portion of the VWS 100. The VWS 100 may also include one or more other devices such as a video wall controller 102, display panel computing devices 104a-d, and/or display panels 106a-d. Note that the VWS 100 may not include all of these devices and may include additional devices.

The systems and devices in the VWS 100 may be configured to communicate between one or more of the devices, perhaps according to one or more protocols, so as to cause the VWS 100 to carry out functions described herein. The devices of the VWS 100 may communicate with each other and/or with external devices via one or more communication paths. Generally, the communication paths between devices may be provided via wired and/or wireless communication in accordance with one or more communication protocols as necessary to achieve desired performance characteristics (e.g., bandwidth, latency). For example, the video wall controller 102 and the display panel computing devices 104a-d may communicate via paths 110a-d, respectively. And the display panel computing devices 104a-d may communicate with the display panels 106a-d via paths 112a-d, respectively.

Furthermore, the devices of the VWS 100 may communicate with external devices, perhaps according to one or more protocols. For instance, the display panel computing devices 104a-d may communicate with one or more video sources (e.g., a media server) that can provide video streams (e.g., a live video stream) in real-time. As shown in FIG. 1, the display panel computing devices 104a-d may communicate with video sources Multicast Device 1 and Multicast Device 2 (also labelled in FIG. 1 as 118, 120 respectively) via paths 122a-d and 124a-d, respectively.

FIG. 1 also illustrates a signal 114 that is provided to the video wall controller 102 and the display panel computing devices 104a-d via communication paths 116a-e, respectively. The signal 114 may be a synchronization signal that is used to synchronize the devices of the VWS 100. For instance, the signal 114 may be a genlock signal that may be used to synchronize the devices of the VWS 100, particularly the video wall controller 102 and the display panel computing devices 104a-d. As such, the signal 114 may effectively operate as a "clock" signal for the devices of the VWS 100. The signal 114 may be an output (e.g., a video output) from a source that is integrated within or coupled to the VWS 100. Alternatively, the signal 114 may be generated by a signal generator, perhaps for the purpose of synchronizing the devices of the VWS 100. Note that other synchronization techniques are possible. As such, in some embodiments of the VWS 100, the VWS 100 may not include the signal 114 and/or the communication paths 116a-e.

As also shown in FIG. 1, the video wall 108 is made up of symmetrically arranged display panels 106a-d. The display panels 106a-d, which are identical in size, are grouped in a 2×2 array. The display panels 106a-d and the configuration of the video wall 108 shown in FIG. 1 serve as examples only, and other display panels and/or configurations may be possible. For example, the video wall 108 may include a different number of display panels and/or may include display panels of varying sizes. The display panels may also be arranged in other arrangements, such as asymmetrical arrays, arrays that form a particular shape, etc. Additionally, the video wall 108 may include display panels arranged in groups that are interspaced by gaps. For example, the video wall 108 may include a first group of display panels arranged in a 3×3 array and a second group of display panels arranged nearby in a 3×1 array.

Furthermore, the display panels 106a-d combine to form a displayable area on the video wall 108. This displayable area may also be referred to as a "video canvas" of the video wall 108. The resolution of the video canvas may be determined by a resolution of each display panel in the video wall 108, where the resolution of each display panel may be defined by a number of pixels in each dimension of the panel (e.g., an Ultra High Definition (UHD) display panel is defined by 3840 by 2160 pixels). As such, the resolution of the video canvas may be the sum of the pixels of each display panel in each dimension. For example, a video canvas of a video wall with four UHD display panels arranged in a 2×2 array may have a resolution of 7680 by 4320 pixels (also known as 8K UHD).

The display panels 106a-d may be configured by the video wall controller 102 to display video content on the video canvas. To control the display panels 106a-d, the video wall controller 102 may be configured to perform functions related to determining a desired output to display on the video canvas and causing the display panels 106a-d to display the desired output.

In an embodiment, the video wall controller 102 may determine the desired output from a layout descriptor document that describes the desired output. The layout descriptor document may describe the desired output as a single video for display on the display panels 106a-d of the video wall 108. The desired output may include desired content that is arranged in a desired layout. The layout descriptor document may describe the desired content by including, among other data, a type (e.g., video, graphic, background, effect, etc.) and/or source of the desired content, a desired output time (e.g., commencement and conclusion time), and a duration of output. The desired content may include video content, video effects, image content, etc. The video content may be pre-recorded video content that is stored in data storage or may be live video content that is provided by a video source.

In an implementation, the layout descriptor document may describe the desired layout of the desired content by mapping the desired content to the video canvas. In an example, the layout descriptor document may map pixels of the desired content to pixels of the video canvas. This mapping may rely on a space descriptor document that describes a layout of the display panels 106a-d in physical space (e.g., two-dimensional physical space). In particular, the space descriptor document may indicate the layout and dimensions of the video canvas in physical space. Such information may be used to map the pixels of the desired content to the pixels of the video canvas.

In an embodiment, the layout descriptor document may be a markup document that uses a markup language and/or a style sheet language to programmatically describe the desired output. The markup language may be one of TeX, LaTeX, Extensible Markup Language (XML), XUL, XML-based languages (e.g., Scalable Vector Graphics), Hypertext Markup Language (HTML), and XHTML, among other languages. And the style sheet language may be one of Cascading Style Sheets (CSS), Document Style Semantics and Specification Language (DSSSL), Extensible Stylesheet Language (XSL), JavaScript Style Sheets (JSSS), among other languages.

In an implementation, a user may provide the layout descriptor document to the video wall controller 102. For example, the user may create the layout descriptor document using a computing device, perhaps the video wall controller 102, and may provide the layout descriptor document to the video wall controller 102. In another implementation, the video wall controller 102 may create the layout descriptor document based on user inputs. In this implementation, the video wall controller 102 may display a representation of the video canvas to a user. The user may view the representation and may provide inputs indicative of the desired output. Based on the user inputs, the video wall controller 102 may create the layout descriptor document that describes the desired output. In yet another implementation, the video wall controller 102 may receive the layout descriptor document from a remote computing device (e.g., an Internet server).

In an embodiment, the video wall controller 102 may interpret the layout descriptor document to generate data vectors that describe the desired output. The resultant data vectors from the interpretation may describe pre-recorded video content and live video content of the desired output differently. Specifically, the data vectors may describe the pre-recorded content by describing pixels of the pre-recorded content. For instance, the data vectors may describe RGB values of the pixels of the pre-recorded content. On the other hand, the resultant data vectors may describe live content by reference. For instance, the data vectors may describe the live content by identifying a video source of the live content, a layer level of the live content, and/or a desired layout of the live content in the desired output. In an example, the desired layout of the live content may be described by indicating absolute coordinates of pixels of the live content in the overall layout of the desired output.

In an embodiment, the video wall controller 102 may interpret the layout descriptor document to determine the data vectors that describe the desired output on a frame-by-frame basis. In this embodiment, the video wall controller 102 may iteratively determine the data vectors that describe the desired output. In each iteration, the controller 102 may determine the data vectors that describe a frame of the desired content. Iteratively determining the data vectors may allow the video wall controller 102 to cause the display panels 106*a-d* to display the desired output frame-by-frame.

After determining the data vectors that describe a frame of the desired output, the video wall controller 102 may store the resultant data vectors in memory. The process of determining the data vectors that describe a frame of the desired output and storing the resultant data vectors in memory may be referred to as "writing the data vectors." The display panel computing devices 104*a-d* may then read the stored data vectors and cause the display panels 106*a-d* to display the frame in a process called "outputting the data vectors." Both of these processes may be performed iteratively for each frame of the desired output so that the display panels 106*a-d* may display the desired output frame-by-frame.

To synchronize when the system performs the processes, a vertical blanking interval of the signal 114 may be used to define a periodic write interval and a periodic output interval. During an instance of the write interval, the video wall controller 102 may "write the data vectors" that describe a frame of the desired output. And during an instance of the output interval, the display panel computing devices may read the data vectors from memory and may cause the display panels to synchronously display the frame. Because the signal 114 is used to determine when to display a frame of the desired output, the frame rate of the signal 114 may be the same frame rate of the desired output.

During the process of "writing the data vectors," the video wall controller 102 may interpret the layout descriptor document by using a markup language to translate the description of the desired output. As explained above, the layout descriptor document may describe each pixel of the desired output. Therefore, the video wall controller 102 may interpret each pixel of a frame of the desired content to generate a respective data vector that describes each pixel. In an implementation, the video wall controller 102 may interpret the pixels in a particular order. For example, the video wall controller 102 may interpret a first line pixel line of the frame, continuing with each consecutive pixel line, and ending with the last pixel line of the frame. When interpreting each pixel line, the controller 102 may interpret the pixels from left to right. As such, the left-most pixel in the first pixel line of the frame is interpreted first, and the right-most pixel in the last pixel line of the frame is interpreted last.

Once the video wall controller has generated the data vectors that describe the frame, the controller 102 may store the data vectors in memory. In the example where each data vector describes a respective pixel, a number of memory locations in which the data vectors are stored may be equivalent to the number of pixels of the frame (assuming that each data vector is stored in a respective memory location).

The video wall controller 102 may also store the resultant data vectors in memory in a particular order. For example, the controller 102 may store the data vectors in an order that corresponds to the order in which the pixels to which the data vectors correspond were interpreted. Accordingly, the video wall controller 102 may start by storing the data vectors that correspond to the first pixel line of the frame, continuing with the data vectors that correspond to each consecutive pixel line, and ending with the data vectors that correspond to the last pixel line of the frame. When storing the data vectors that correspond to a pixel line, the data vectors are stored in order starting with the data vector that corresponds to the left-most pixel in the line and ending with the data vector that corresponds to the right-most pixel in the pixel line.

During the process of "outputting the data vectors," the display panel computing devices 104*a-d* may access the data vectors. In an embodiment, the display panel computing devices 104*a-d* may access the data vectors from memory in the same order in which the video wall controller 102 stored the data vectors. Accordingly, the display panel computing devices 104*a-d* may access the data vectors starting with a data vector that corresponds to the top right-most pixel of the frame.

Each display panel computing device may then determine respective data vectors that describe a respective portion of the desired output for display by the respective display panel coupled to the display panel computing device. The respective data vectors may also be referred to as "relevant data vectors" to the respective display panel and/or the respective display panel computing device. To determine its relevant data vectors, a display panel computing device may use the space descriptor document to determine the absolute coordinates of the pixels of the respective portion of the desired output. From the absolute coordinates of the pixels, the display panel computing device may determine the memory locations of the data vectors that describe the pixels. The display panel computing device may be able to do so because the data vectors are stored in memory in a specific order known to the display panel computing device.

When reading the relevant data vectors, the display panel computing device may read a data vector that describes a pixel of pre-recorded video content. The display panel computing device may be able to differentiate between data vectors that describe pre-recorded content and data vectors that describe live content because data vectors that describe live content may include an identifier that indicates that the data vector describes live content. In response to reading a data vector that describes a pixel of pre-recorded video content, the computing device may cause a corresponding pixel on the respective display panel to operate according to the description of the pixel. For instance, when the data vector describes an RGB value of the pixel, the computing device may cause the corresponding pixel of the respective display panel to operate according to the RGB value.

Additionally, when reading the relevant data vectors, the display panel computing device may read a data vector that describes live video content. As explained above, data vectors that describe live content may also include an identifier of a source of the live content, a layer level of the live content, and/or a position of the live content in the desired output. Accordingly, when the display panel computing device reads a data vector that describes live content, the computing device may use the video source identifier to request the live content from the video source (e.g., a media server). For instance, the display panel computing devices 104*a-d* may request live content from Multicast Device 1 and/or Multicast Device 2. In response, Multicast Device 1 and/or Multicast Device 2 may provide the display panel computing devices 104*a-d* with a multicast or video stream that represents the live content. Note that the display panel computing device may request the video stream from the video source during the first frame, and that the display panel computing device may have access to the stream in subsequent frames.

Once a display panel computing device receives the video stream, the display panel computing device may run, either locally or remotely, a software player to decode the received video stream. The display panel computing device may use the data vectors that describe live content to determine a respective portion of the displayable area that will display the live content. The display panel computing device may then cause the respective display panel to display the live content on the respective portion of the displayable area.

In some examples, the display panel computing device may determine, based on the data vectors that describe live content, that a resolution of the live content represented by the video stream is different from a desired resolution of the live content. In such examples, the display panel computing device may scale the live content, and may then cause the display panel to display the scaled version of the live content.

In other examples, the display panel computing device may determine, based on the data vectors that describe live content, that only a portion of the live video content is for display on the respective display panel. Accordingly, the display panel computing device may cut the live content to the portion of the live video content that is for display on the respective display panel. The display panel computing device may cause the respective display panel to display the portion of the live video content.

In yet other examples, the display panel computing device may determine, based on the data vectors that describe live content, that the live content may include content from more than one video source. Additionally, the display panel computing device may determine that the desired positions of the live content from the different video sources overlap in a portion of the displayable area of the respective display panel. In response, the display panel computing device may determine, from the data vectors, a respective layer for the live content from each video source. Based on the layer level of the live content from each video source, the display panel computing device may determine to display the live content from one of the video sources in the overlapping area in the displayable area of the respective display panel.

III. Example Display of Video Content on a Video Wall

Figure 2A:
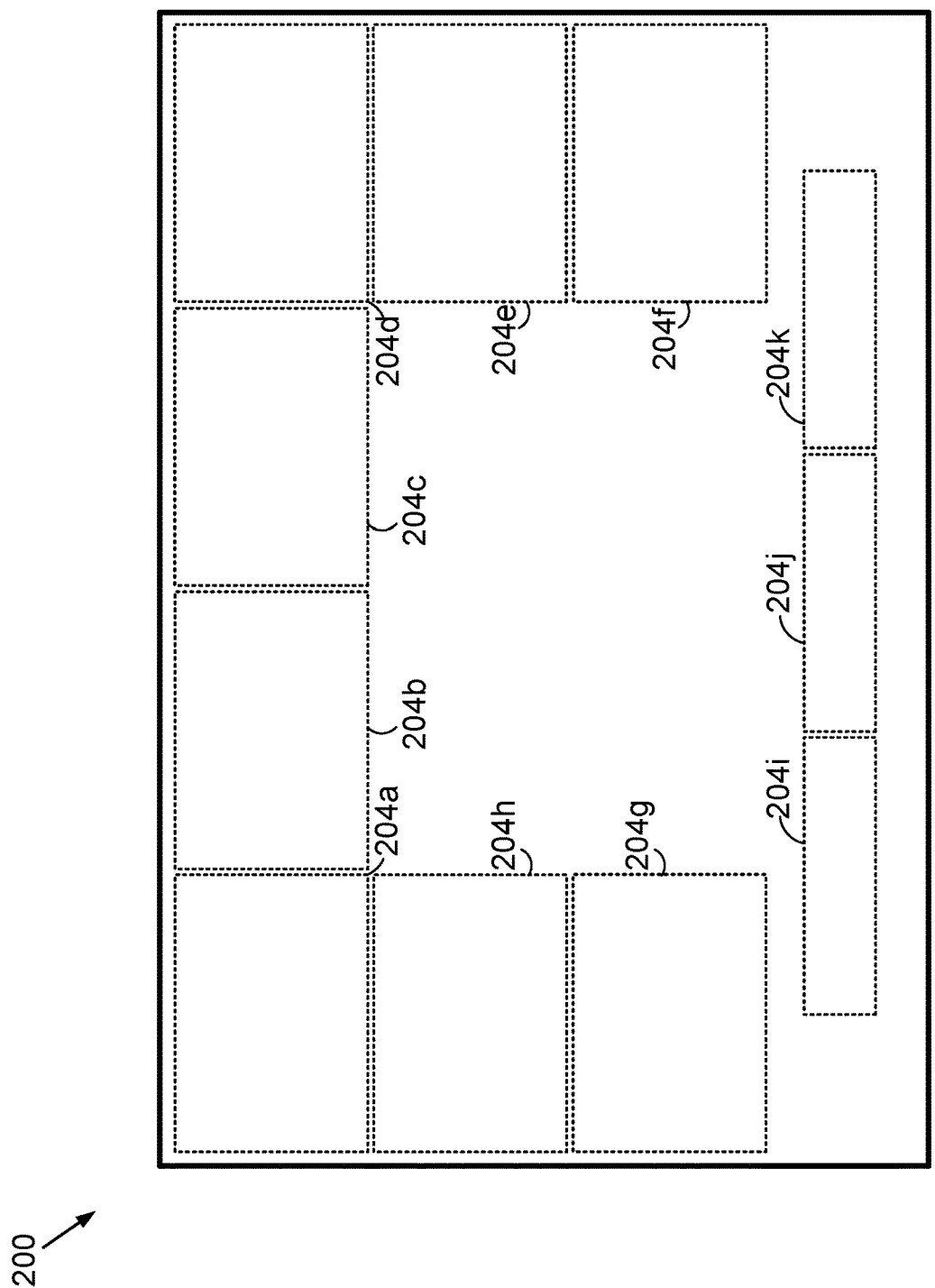
FIG. 2A is a simplified diagram of a video wall that includes a plurality of display panels.

FIG. 2A illustrates a representation of a video wall 200, according to an example embodiment. As shown in FIG. 2A, the video wall 200 includes display panels 204*a-k*. The displayable areas of display panels 204*a-k* of the video wall 200 form a video canvas that can display video content. Additionally, the video wall 200 may be part of a video wall system, such as the VWS 100 depicted in FIG. 1. Thus, like the VWS 100 of FIG. 1, the video wall 200 may be controlled and/or configured by a video wall controller (not shown in FIG. 2A), and each of the display panels 204*a-k* may be coupled to a respective display panel computing device (not shown in FIG. 2A).

The layout of the video wall 200 may be described in a space descriptor document. As shown in FIG. 2A, the display panels 204*a-k* of the video wall 200 are arranged in two groups. The first group includes two sets of 3×1 display panels (display panels 204*a,h,g* and display panels 204*d,e,f*) with two display panels (display panels 204*b,c*) interspacing the top-most display panels of the two sets. The second group includes a set of 1×3 display panels (display panels 204*i-k*) that are positioned below the first group. As shown in FIG. 2A, there is a gap between the two groups of panels.

The resolution of the video wall 200 may be a combination of the resolutions of the display panels 204*a-k*. For example, the display panels 204*a-g* may each have a resolution of 1920×1080 pixels, and the display panels 204*i-k* may each have a resolution of 640×1080 pixels. Accordingly, the resolution of each set of 3×1 display panels (i.e., display panels 204*a, h, g* and display panels 204*d,e-f*) is 5760×1080 pixels, and the combined resolution of the two interspacing panels 204*b, c* is 1920×2160 pixels. Further, the combined resolution of the 1×3 display panels 204*i-k* is 640×3240 pixels. Note that these are example resolutions and that other resolutions are possible.

Figure 2B:
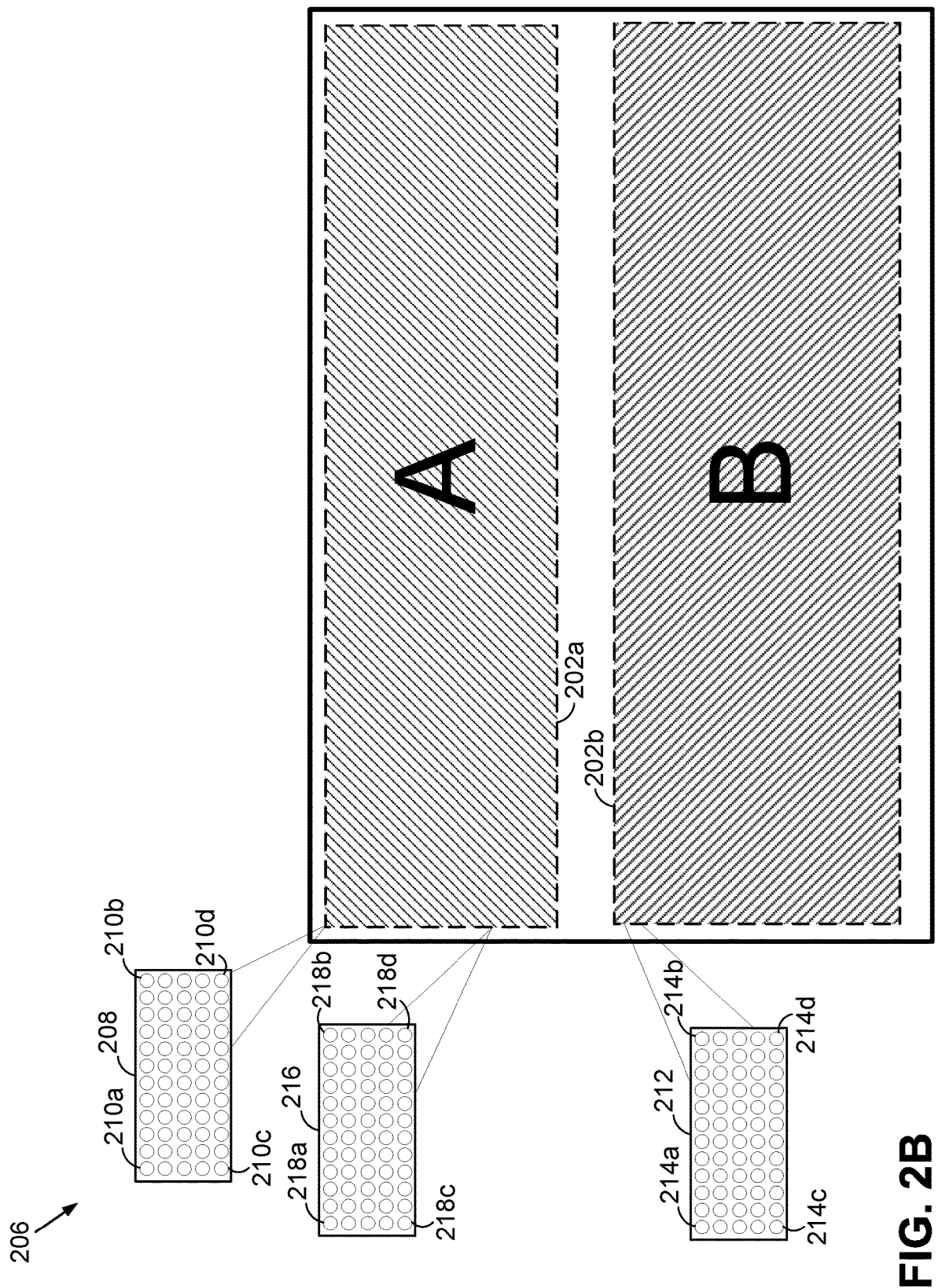
FIG. 2B is a simplified diagram of a desired output for display on the video wall of FIG. 2A.

FIG. 2B illustrates a desired output 206 for display on the video wall 200, according to an example embodiment. In this example, the desired output 206 includes pre-recorded video content A and live video content B, labelled in FIG. 2B as 202*a*, 202*b* respectively. The video wall controller may have access to a layout descriptor document that describes the desired output 206. As explained above, the layout descriptor document may map the desired output 206 to the video canvas of the video wall 200, perhaps by mapping the pixels of the desired output 206 to the pixels of the video canvas. By mapping the desired output 206 to the video canvas, the layout descriptor document may indicate a desired layout of the desired output 206 on the video canvas.

In line with the discussion above, the video wall controller may interpret the layout descriptor document to determine data vectors that describe the desired output 206 on a frame-by-frame basis. Specifically, during an instance of a periodic write interval, the video wall controller may interpret the layout descriptor document to determine the data vectors that describe a frame of the desired output 206. By way of example, the video wall controller may interpret pixels (e.g., pixel arrays 208, 212, 216) of the desired output 206 as described by the layout descriptor document. The video wall controller may interpret the pixels in a particular order, e.g., in order starting from the top pixel line and ending with the bottom pixel line, and from the left-most pixel to the right-most pixel in each pixel line. When interpreting the pixels of the output 206 in this order, pixels 214*a-d* of the pixel array 208 are interpreted in the following order: 214*a*, 214*b*, 214*c*, 214*d*.

Also during the write interval, the video wall controller may store the resultant data vectors in memory, perhaps in a particular order. For example, the video wall controller may store the data vectors in an order that mirrors the order in which the pixels were interpreted. Accordingly, in this example, the data vectors that correspond to the pixels 214*a-d* are stored in the following order: the data vector that corresponds to 214*a*, the data vector that corresponds to 214*b*, the data vector that corresponds to 214*c*, the data vector that corresponds to 214*d*.

During the next iteration of a read interval, the display panel computing devices may retrieve the data vectors that describe the frame of the desired output 206. The display panel computing devices may also retrieve the space descriptor document that describes the layout of the video wall 200. A display panel computing device may use the space descriptor document to determine the data vectors that are relevant to the display panel computing device. The relevant data vectors to the display panel computing device are the data vectors that describe a respective portion of the desired output 206 for display by the respective display panel coupled to the display panel computing device. To retrieve a relevant data vector, the display panel computing device may determine a memory location in which the data vector is stored. The computing device may do so using the absolute coordinates of the pixel that is described by the data vector and a byte length of the data vectors. For example, assuming that pixel 214a is a first pixel of the desired output 206, the pixel 214a is stored in a first memory location. And assuming pixel 214b is the 12$^{th}$ pixel of the desired output 206, the memory location in which the pixel 214b is stored may be determined by multiplying 12 by the byte length of the data vectors.

Once the display panel computing device has determined the relevant data vectors, the computing device may use the data vectors to cause the respective display panel to display the respective portion of the desired output 206. In particular, the display panel computing device may read the relevant data vectors in the order in which the data vectors were retrieved from memory. As explained above, if the display panel computing device reads a data vector that describes a pixel of pre-recorded video content, the computing device may cause a corresponding pixel on the respective display panel to operate according to the description of the pixel. And if the display panel computing device reads a data vector that describes live video content, the computing device may use the information stored in the data vector to cause the respective display panel to display the live video content.

To illustrate how content is displayed on a display panel, consider the display panel 204h. The display panel computing device coupled to the display panel 204h may determine the relevant data vectors for the display panel 204h, where the relevant data vectors may describe the respective portion of the desired output 206 for display by the display panel 204h. In this example, the respective portion of the desired output 206 may include a portion of the pre-recorded content 202a and a portion of the live content 202b. In particular, the display panel computing device may determine that the pixel arrays 212 and 216, among other pixel arrays, include relevant pixels to the display panel 204h. That is, the pixel arrays 212 and 216 of the desired output 206 are for display on the display panel 204h, and therefore, correspond to pixels of the display panel 204h. Accordingly, the display panel computing device may retrieve the data vectors that describe the portion of the desired output 206 for display on the display panel 204h. The retrieved data vectors include data vectors that describe the pixel arrays 212 and 216.

The display panel computing device may read the retrieved data vectors to display to the portion of the desired output 206 on the display panel 204h. As explained above, the display panel computing device may read the data vectors in a particular order, perhaps in the order in which the data vectors were stored in memory. Here, because the data vectors that describe the pre-recorded content 202a are stored in memory before the data vectors that describe the live content 202b, the display panel computing device may read the data vectors that describe the pre-recorded content 202a before the data vectors that describe the live content 202b.

When reading the data vectors that describe the pre-recorded content 202a, the display panel computing device may determine a description of the portion of the pre-recorded content 202a for display by the display panel 204h. In an example, the relevant data vectors may describe each pixel of the pre-recorded content 202a for display by the 204h. For instance, each data vector may describe an RGB value of a corresponding pixel of the pre-recorded content 202a. Additionally, the display panel computing device may determine, perhaps using the space descriptor document, a mapping of the relevant data vectors to the display panel 204h. The display panel computing device may use the description of the pre-recorded content 202a and the mapping to cause the display panel 204h to display the portion of the pre-recorded content 202a.

For instance, the display panel computing device may read a data vector that describes pixel 218a of the pre-recorded content to determine an RBG value of the pixel. The display panel computing device may then determine a respective pixel of the display panel 204h that corresponds to pixel 218a. The display panel computing device may cause the corresponding pixel of the 206h to operate according to the RGB value of pixel 218a. This process may be performed for each relevant pixel of the pre-recorded content 202a, such as pixels 218b-d.

When reading the relevant data vectors that describe the live content 202b, the display panel computing device may determine a description of the portion of the live content 202b for display by the display panel 204h. In an example, the description of the live content 202a may include an identifier of a video source of the live content 202b, a layer level of the live content 202b, and/or a desired layout of the live content 202b in the desired output 206 (e.g., coordinates of the top-left pixel of the live content 202b and coordinates of the bottom-right pixel of the live content 202b). The display panel computing device may use the identifier of the video source of the live content 202b to receive a video stream that represents the live content 202b. Additionally, in examples where a portion of the live content 202b is for display on the display panel 204h, the display panel computing device may use the desired layout of the live content 202b and the space descriptor document to determine the portion of the content 202b for display on the display panel.

In an implementation, the description of the live content 202a may be included in a relevant data vector. For instance, the description may be included in the data vector that corresponds to the first pixel of the live content 202a. In this example, assuming that pixel 214a is a first pixel of the live content 202b, when the display panel computing reads the data vector that corresponds to the pixel 214a, the display panel computing device may determine that a portion of the live content 202b is for display on the display panel 204h. In response, the display panel computing device may access a video stream that represents the live video content 202b. To display the live content 202b, the display panel computing device may run a decoder that decodes the video stream. Because only a portion of the live content 202b is for display on the display panel 204h, the display panel computing device may determine the coordinates of the portion of the live content 202b. The display panel computing device may cut the live content 202b to generate the portion of the live content 202b, and cause the display panel 204h to display the portion of the desired output 206.

This process may be performed simultaneously or nearly simultaneously by each of the display panels 204a-g and 204i-k. That is, each of the display panel computing devices coupled to the display panels 204a-g and 204i-k determines respective relevant data vectors stored in memory, and uses the data vectors to display a respective portion of the frame of the desired output 206. By doing so, the video wall 200 may collectively display the frame of the desired output 206.

Figure 2C:
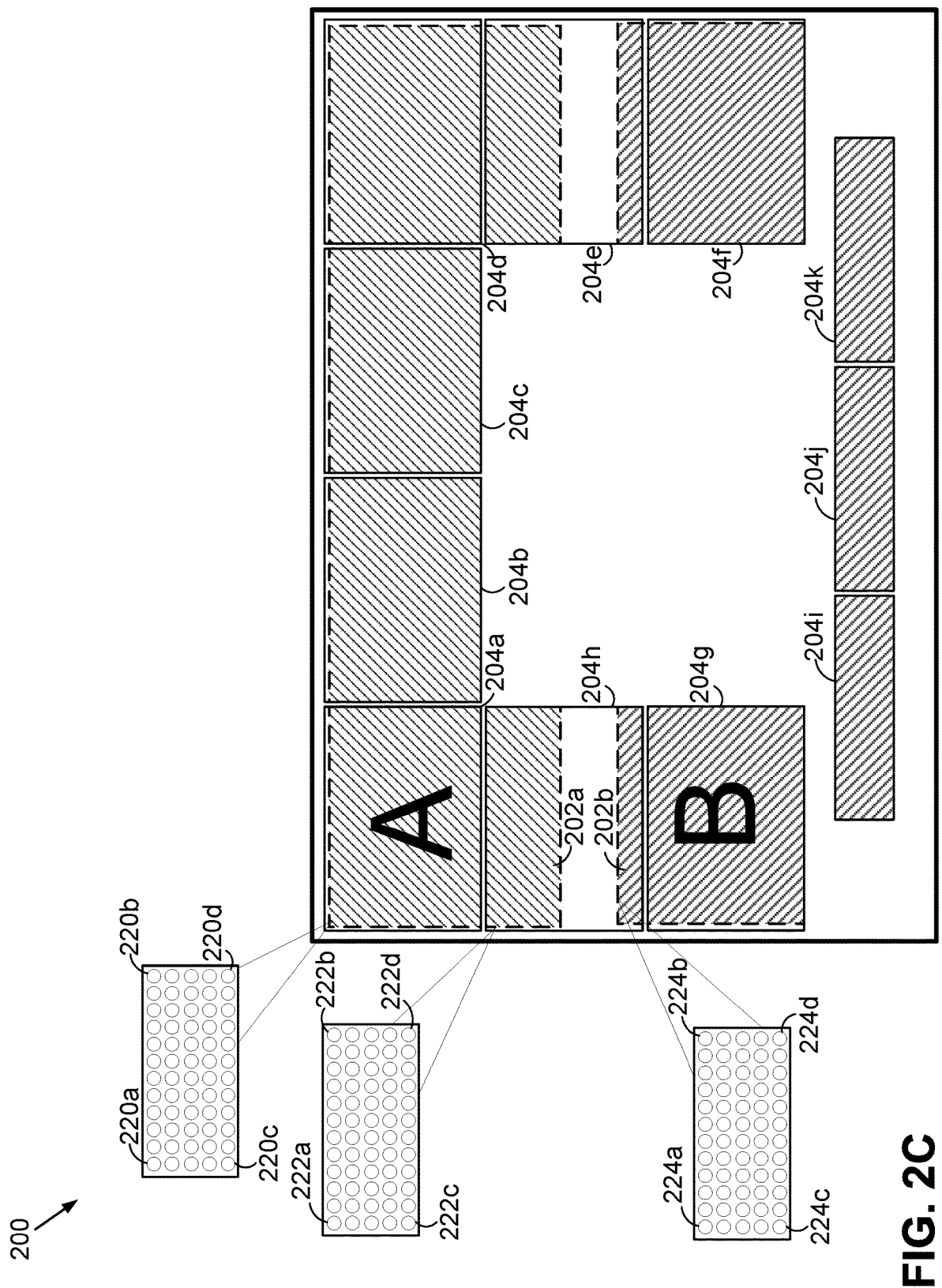
FIG. 2C is a simplified diagram of the video wall of FIG. 2A displaying the desired output of FIG. 2B.

FIG. 2C illustrates the video wall 200 displaying a frame of the desired output 206, according to an example embodiment. As shown in FIG. 2C each of the display panels 204a-k displays a respective portion of the desired output 206. In particular, the pixels of the display panels 204a-k may each display a respective pixel of the desired output 206 as described by the layout descriptor document. For example, the pixels 210*a*, 210*b*, 210*c*, 210*d* correspond to pixels 220*a*, 220*b*, 220*c*, 220*d* of the display panel 204*a*, respectively. Accordingly, the pixels 220*a*, 220*b*, 220*c*, 220*d* display the pixels 210*a*, 210*b*, 210*c*, 210*d*, respectively. Similarly, the pixels 222*a*, 222*b*, 222*c*, 222*d* display the pixels 218*a*, 218*b*, 218*c*, 218*d*, respectively, and the pixels 224*a*, 224*b*, 224*c*, 224*d* display the pixels 214*a*, 214*b*, 214*c*, 214*d*, respectively.

The processes described above may be performed iteratively for each frame of the desired output 206, perhaps for a particular period of time. During each iteration, the controller may determine the data vectors that describe a frame of the desired output 206. Iteratively determining the data vectors may allow the video wall controller to cause the display panels 204*a-k* to display the desired output 206 frame-by-frame.

Figure 3A:
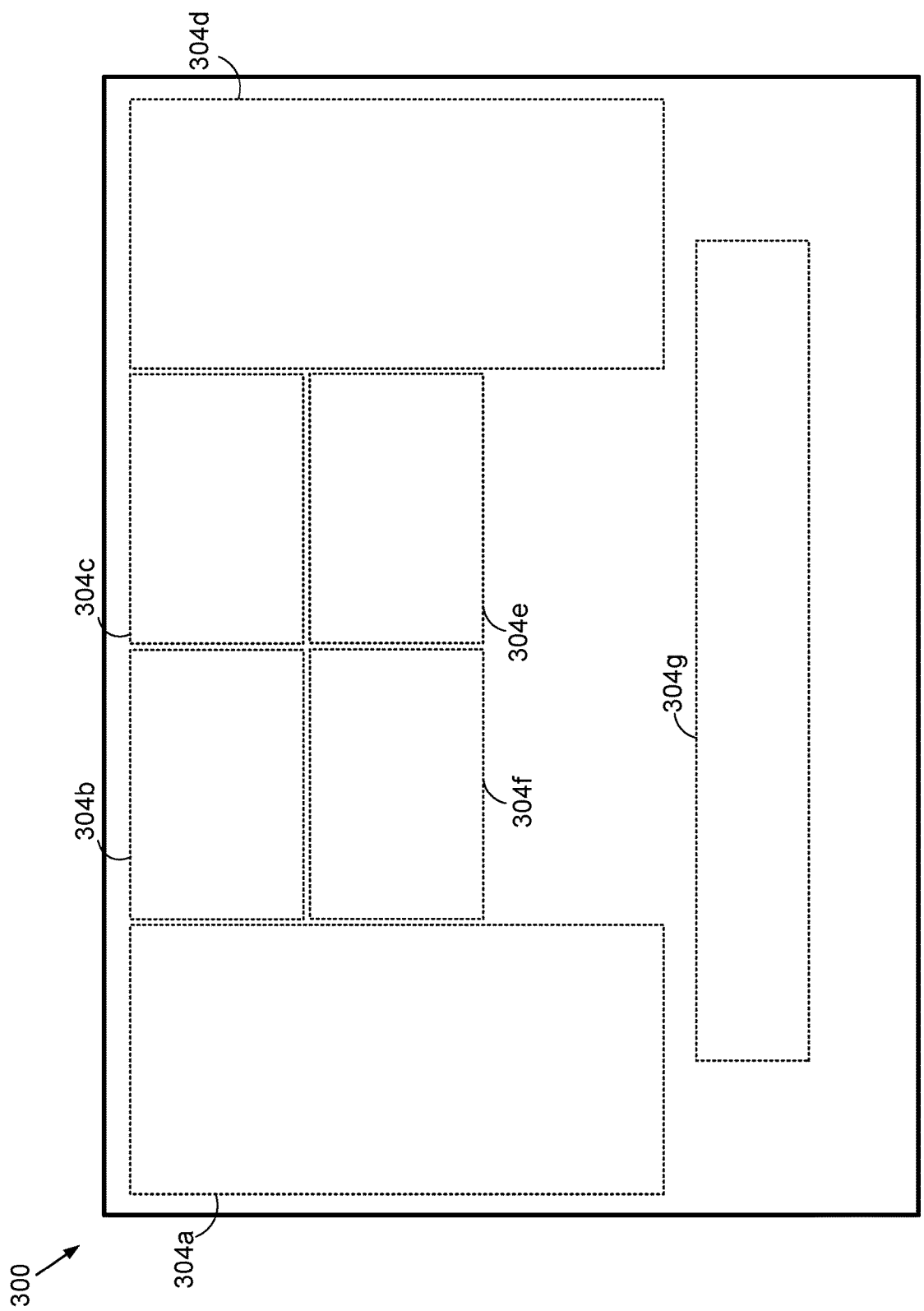
FIG. 3A is a simplified diagram of another video wall that includes a plurality of display panels.

FIG. 3A illustrates a representation of a video wall 300, according to an example embodiment. As shown in FIG. 3A, the video wall 300 includes display panels 304*a-g*. The displayable areas of display panels 304*a-g* of the video wall 300 form a video canvas that can display video content. Additionally, the video wall 300 may be part of a video wall system, such as the VWS 100 depicted in FIG. 1. Thus, like the VWS 100 of FIG. 1, the video wall 300 may be controlled and/or configured by a video wall controller (not shown in FIG. 3A), and each of the display panels 304*a-g* may be coupled to a respective display panel computing device (not shown in FIG. 3A).

Figure 3B:
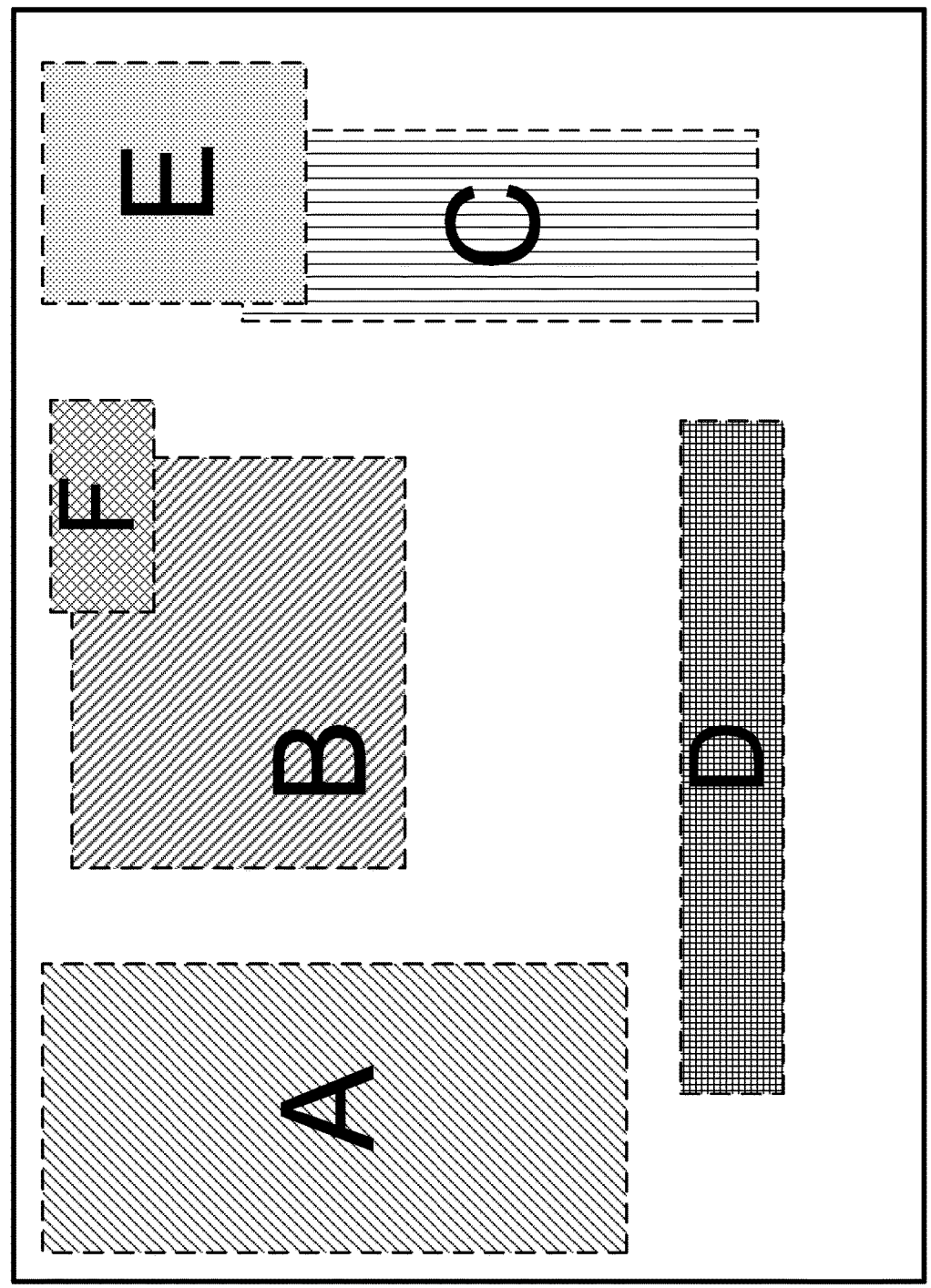
FIG. 3B is a simplified diagram of a desired output for display on the video wall of FIG. 3A.

FIG. 3B illustrates a desired output 306 for display on the video wall 300, according to an example embodiment. Each of the hashed regions in FIG. 3B may represent content, such as video content, images, dynamic text, logos, or other visual content. As shown in FIG. 3B, the desired output 306 includes content that are labeled as A, B, C, D, E. In this example, content B and content F are live video content.

As explained above, the video wall controller may interpret a layout descriptor document to determine data vectors that describe the desired output 306 on a frame-by-frame basis, and may store the resultant data vectors in memory. To display a frame of the desired output 306, the display panel computing devices may read the data vectors and may each determine respective relevant data vectors that describe a respective portion of the frame of the desired output 306 for display by a respective display panel.

Consider, for example, the display panel 304*c*. A display panel computing device coupled to the display panel 304*c* may determine relevant data vectors that describe a portion of the frame of the desired output 306, namely the data vectors that describe live video content B and live video content F. When reading the relevant data vectors, the display panel computing device may determine that that content B and content F are live video content. Accordingly, the display computing device may access a respective video stream that represents each of the content B and content F. The display panel computing device may decode the video streams and may cut the video content represented by the video streams as necessary. Additionally, the display panel computing device may scale the video content as necessary. In this example, only a portion of the content B is for display on the display panel 304*c*. Thus, the display panel computing device may cut the portion of the content B from the video content represented by the video stream. Additionally, if necessary, the display panel computing device may scale the cut portion of the content B.

Additionally, the display panel computing device may determine that there is overlap in the desired display area of the content B and the content F. As shown in FIG. 3B, a portion of the content B and the content B overlap. In response to determining that there is an overlap, the display panel computing device may determine, from the relevant data vectors, a respective layer level for the content B and the content F. Based on the layer levels, the display panel computing device may cause the display panel 304*c* to display one of the content B and content F in the overlapping display area. For example, the display panel computing device may display the content with a higher priority layer level. Numerically, the layer level with a higher priority may be greater than or less than the other layer level. In this example, content F may have a higher priority level, and therefore, content F will be displayed in the overlapping display area.

Figure 3C:
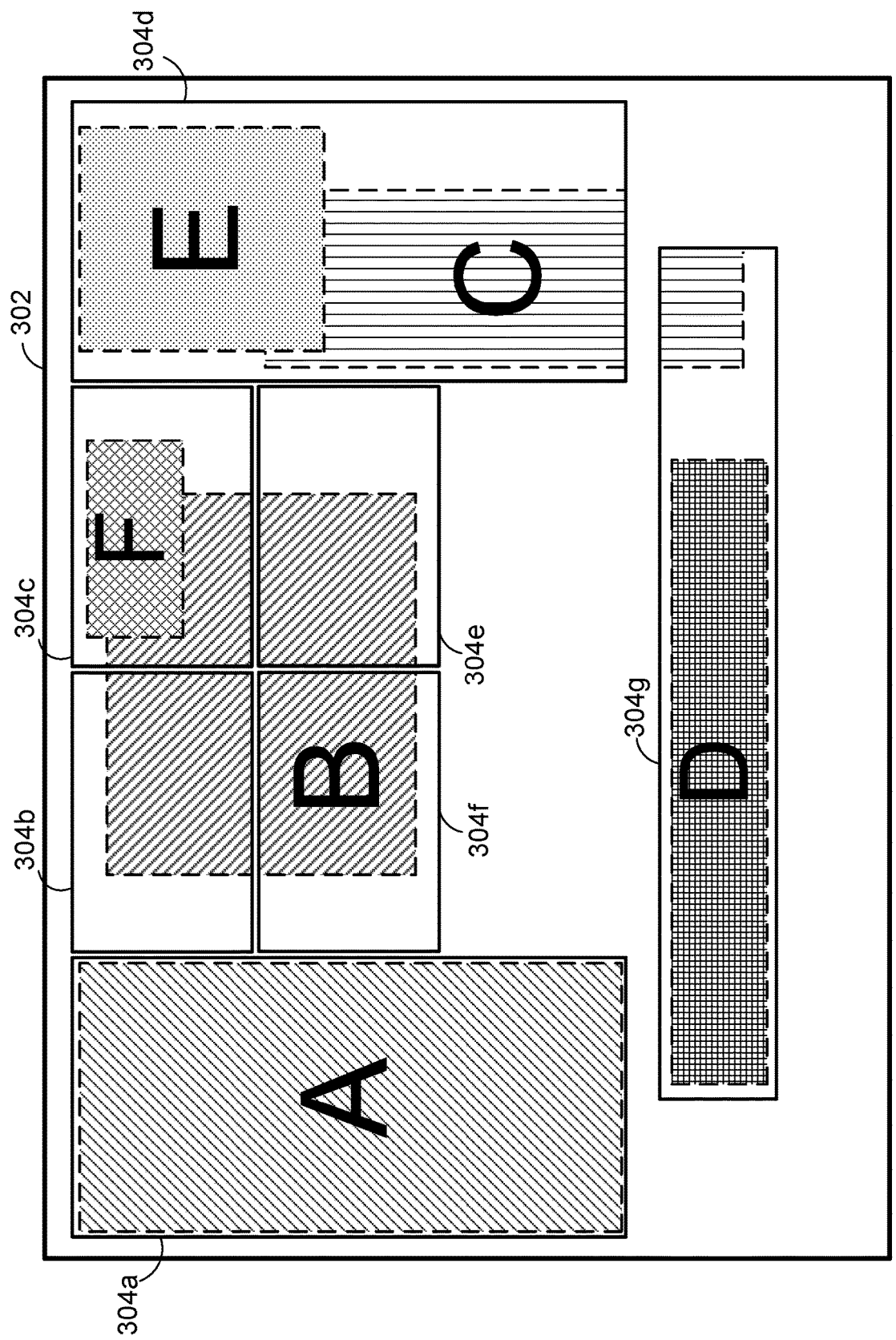
FIG. 3C is a simplified diagram of the video wall of FIG. 3A displaying the desired output of FIG. 3B.

FIG. 3C illustrates a simplified diagram of the video wall 300 displaying the desired output 306, according to an example embodiment. As shown in FIG. 3C, the desired content may be rendered in a region that spans multiple display panels. Further still, a static or dynamic background may be included and static or dynamic text, logos, other visual content, etc., may be included on the background and/or superimposed over the clip-filled regions. Yet further, the video wall system may recognize that the content F has a higher priority layer level than content, and may therefore display the content B.

IV. Example VPS

Figure 4:
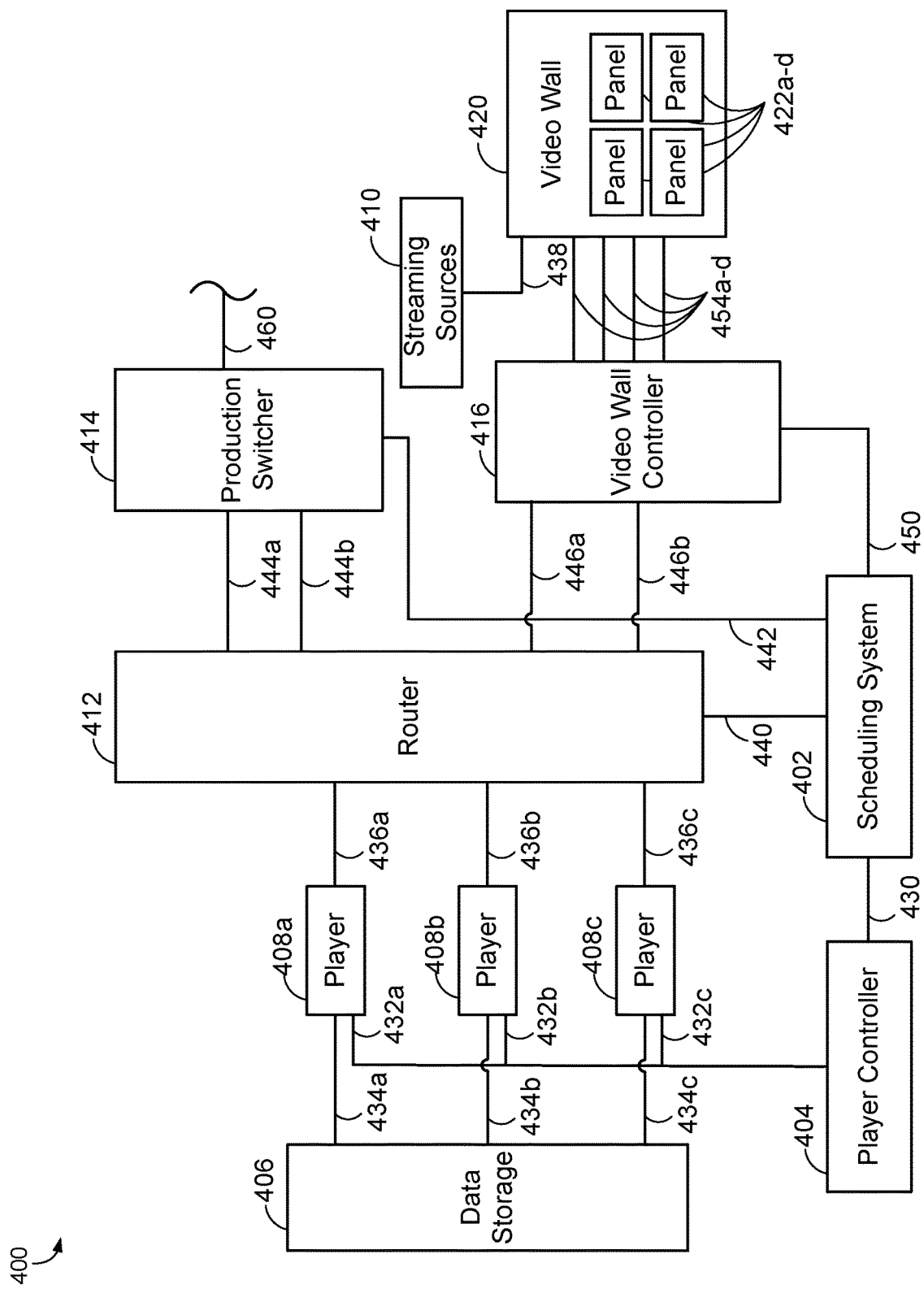
FIG. 4 is a simplified diagram of a video wall system integrated within a video production system.

FIG. 4 is a simplified block diagram of an example video production system (VPS) 400, such as a news production system. The VPS 400 may be configured to perform a variety of functions related to producing a video program (e.g., a news program). The VPS may output the video program in video form, which in turn may be sent to a television-broadcasting system for broadcast. It is understood that the video output from the VPS 400 may be subjected to additional processing before being broadcast. For example, the video may be modified with a digital video effect (DVE) before being broadcast.

The VPS 400 may include one or more devices, including for example a scheduling system 402, a player controller 404, a data storage 406, one or more players 408*a-c*, a streaming source 410, a router 412, a production switcher 414, a video wall controller 416, and a video wall 420. The systems and devices in the VPS 400 are configured to communicate between one or more others of the devices so as to cause the VPS 400 to carry out the functions described herein. Note that the VPS 400 need not include all of these devices and it may include additional devices.

The devices in the VPS 400 described herein may communicate with each other and/or with external devices via one or more communication paths. Generally, the communication paths between devices may be provided via wired and/or wireless communication in accordance with one or more communication protocols as necessary to achieve desired performance characteristics (e.g., bandwidth, latency). These devices may communicate with each other and/or with external devices according to one or more protocols. For instance, in the example where the video production system is a news production system, the devices may communicate in accordance with one or more versions of the Media Object Server (MOS) protocol.

As shown in FIG. 4, the scheduling system 402 and the player controller 404 may communicate via path 430, the player controller 404 and the players 408*a-c* may communicate via respective paths 432*a-c*, and the players 408*a-c* and the data storage 406 may communicate via respective paths 434*a-c*. Further, the players 408*a-c* and the router 412 may communicate via respective paths 436*a-c*. The streaming source 410 and the video wall may communicate via path 438. The router 412 may communicate with the video wall controller 416 via respective paths 446*a-b*, and may communicate with the production switcher 414 via respective paths 444*a-b*. The scheduling system 402 and the router 412 may communicate via path 440, and the scheduling system 402 and the production switcher 414 may communicate via path 442. The video wall controller 416 and the video wall 420 (the individual display panels 422*a-d* and the display panel computing devices) may communicate via respective paths 454*a-d*. The scheduling system 402 and the video wall controller 416 may communicate via path 450.

A. Scheduling System

The scheduling system 402 is configured to perform functions related to scheduling and managing the production of a video program. For example, the scheduling system 402 may be configured to read a video program schedule (e.g., data that specifies an order and/or schedule of programming events involved in producing the video program). The scheduling system 402 may include a user interface to allow a user to generate the video program schedule. Once generated, the scheduling system 402 may make the video program schedule available to be accessed by other components in the VPS 400. The VPS components can then access entries in the video program schedule, select one or more entries, read data associated with those entries, and determine actions to perform based on attributes in those entries (i.e., in the received data). As a result, the various components in the VPS 400 perform various actions corresponding to each entry in the sequence indicated by the video program schedule. In some cases, the timing of each event may further be controlled, at least in part, by the scheduling system (e.g., by specifying a particular number of seconds or frame times, or another measure of time between distinct events) or perhaps a user input may indicate a start time for one or more events (e.g., to facilitate timing control by a producer or other individual).

The scheduling system 402 may be alternately referred to herein as a "sequencing system" to reflect its role in setting the sequence of various events, but not necessarily the timing of those events, which may be based on an external input (e.g., a user input). Functionality of the scheduling system 402 to effect automated control of the VPS 400 (e.g., in accordance with a predetermined scripted sequence) is described further herein.

B. Video Sources

The player controller 404 is configured to perform functions related to controlling the video players 408*a-c*, which are configured to retrieve, decode, and play out specified video content. Video files accessible by the players 408*a-c* can be stored in the data storage 406, which may be a drive array storing encoded video files. Upon retrieving and playing out selected videos, the players 408*a-c* can provide output video streams to the router 412. The player controller 404 can operate in accordance with signals via path 430 from the scheduling system 402. Similarly, the player controller can provide respective instructions via paths 432*a-c* to the players 408*a-c*, which cause the players 408*a-c* to locate and access stored video files via signals on paths 434*a-c* with the data storage 406. The players 408*a-c* can then output corresponding video streams communicated via paths 436*a-c* of the decoded video to the router 412.

Each player 408*a-c* may take a variety of forms. For instance, each player 408*a-c* may take the form of a video player device or a software-based video player executing on a computing device.

C. Router

The router 412 receives the video inputs from the players 408*a-c* and/or the streaming source 410, and provides video streams to the production switcher 414 and the video wall controller 418. Control signals via path 440 from the scheduling system 402 (or a sub-system controlled by the scheduling system 402) instruct the router 412 as to how to direct a given input to a given output at a given instant. For example, the router 412 may have a plurality of inputs and a plurality of outputs. At a given instant, the control signals via path 440 from the scheduling system 402 can instruct the router 412 as to which inputs (e.g., the inputs provided on paths 436*a-c*, 438) to map to one or more of the outputs (e.g., via the paths 444*a-b*, 446*a-b*). Video streams provided to the output ports at any given instant are thus based on one of the input streams to the router 412, with which one specified by the instructions via path 440. The router 412 thereby allows the scheduling system 402 to effect switching between different inputs to different components in the VPS 400 at different times.

D. Video Wall

The video wall 420 can include multiple display panels 422*a-d* positioned adjacent one another and operated to jointly render media content provided via the composite display driver. That is, the individual display panels 422*a-d* can operate to each display respective portions of a desired output. The resulting video wall 420 can appear similar to a single display panel that spans the region occupied by the panels 422*a-d* in which the separate panels 422*a-d* may or may not be evident. For example, the display panels 422*a-d* can be substantially co-planar with one another with respective active display surfaces oriented in a common direction. However, alternative configurations may also be employed.

Video wall systems offer some performance advantages in a video production system compared to a single display panel. For instance, the video production system may be a news production system that uses a camera to capture content on the video wall. In order to render video content in a manner that is readily captured by the camera, the individual display panels 422*a-d* are generally driven at a relatively high brightness setting to overcome washout from overhead lights. Due to the expense of display panels with high brightness capabilities, a video wall formed from multiple smaller display panels provides greater affordability and scalability than achievable using a single large display panel. In addition, using multiple individual display panels increases the effective resolution of the assembled composite display because the number of individual pixels in the resulting video wall is generally greater, for a given total display area, than possible with a comparable single display panel. Video walls therefore mitigate pixilation and distortions even when a variety of camera perspectives are captured, including shots that zoom in on a sub-portion of the composite display.

A video wall controller 416 is provided to operate the video wall 420. The video wall controller 416 may operate in accordance with instructions sent from the scheduling systems 402. As such, the video wall 420, and the content rendered on the video wall 420, can be controlled by the scheduling system 402 (e.g., specified by a video program schedule or another predetermined sequence). The video wall controller 416 may provide instructions and/or other data on paths 454*a-d* for the individual display panels 422*a-d* in the video wall 420 so that the panels 422*a-d* jointly render an intended output media stream. The video wall controller 416 may be configured to operate a given one of the display panels 422*a-d* to display a respective portion (e.g. a sub-frame) of an output video stream such that the individual panels 422*a-d* in the video wall 420 are operated in coordination to jointly render the output video stream.

In some examples, the video wall controller 416 may provide instructions to the video wall 420 to display a video stream or a portion thereof. Thus, the video wall 420 can receive video signals via path 438 from the streaming source 410. The streaming source 410 can be configured to provide video that is received by the VPS 400 to be used substantially in real time, rather than pre-recorded video content that is stored in the data storage 406. For example, a streaming source may include live captured video from a production crew reporting in real time from a newsworthy location.

The video wall controller 416 may also be configured to apply a DVE to the incoming video stream(s). For example, the video wall controller 416 may be configured to apply scaling, positioning, perspective, shading, color-correction, and/or other DVEs to one or multiple input video streams provided by the router 412. In one example, the intended output media stream for the video wall 420 may include multiple scaled framed windows overlaid on a background populated by scrolling text. Each window of media content can have a scaling, perspective, and position on the video wall 420 specified by signals from the video wall controller 416, which operates in accordance with instructions from the scheduling system 402.

E. Production Switcher

The production switcher 414 receives video inputs and uses the video input stream to generate a video output stream from the VPS 400, on path 460. The scheduling system 402 can provide instructions to the production switcher 414 via path 442 to indicate which video stream (or multiple video streams) to use to generate the output video stream on path 460. The production switcher 414 can receive video inputs from the router 412 (e.g., streaming sources and/or pre-recorded played out videos via paths 444*a-b*). The output video steam on path 460 may be subjected to further processing and may be passed to a broadcasting system.

In operation then, the scheduling system 402 may be configured to provide information (e.g., a video program schedule) to various components in the VPS 400 to operate such that specified stored or streamed video is rendered on the video wall 420. The video wall 420 can thereby be operated in a substantially automated fashion to render specified media content by the same scheduling system 402 that regulates operation of other devices in the VPS 400. As such, the video wall 420 can be readily integrated into the VPS 400 to render content in accordance with a predetermined script of production events to produce a video program.

In some cases, the performance of the operations described above can be carried out in response to receipt of a user input, which may be used as a timing signal to control the timing or synchronization of various events. For instance, various devices in the VPS may dynamically prime themselves to perform functions specified in a video program schedule, then prompt a user for an input, and initiate performance of those functions in response to receipt of a timing signal based on a user input. As such, a producer (or director or other personnel) may evaluate readiness to perform a given next function(s), and then, upon judging that the system is ready to proceed, provide a user input. Upon receiving the user input, the pertinent VPS devices then initiate the given function(s), perhaps after a predetermined delay interval. Thus, while not specifically illustrated in FIG. 4, one or more of the devices in VPS 400 may include (or be in communication with) a user interface that allows for receiving user inputs and perhaps for outputting information, such as diagnostic and status information, etc.

V. Example Computing Device

Figure 5:
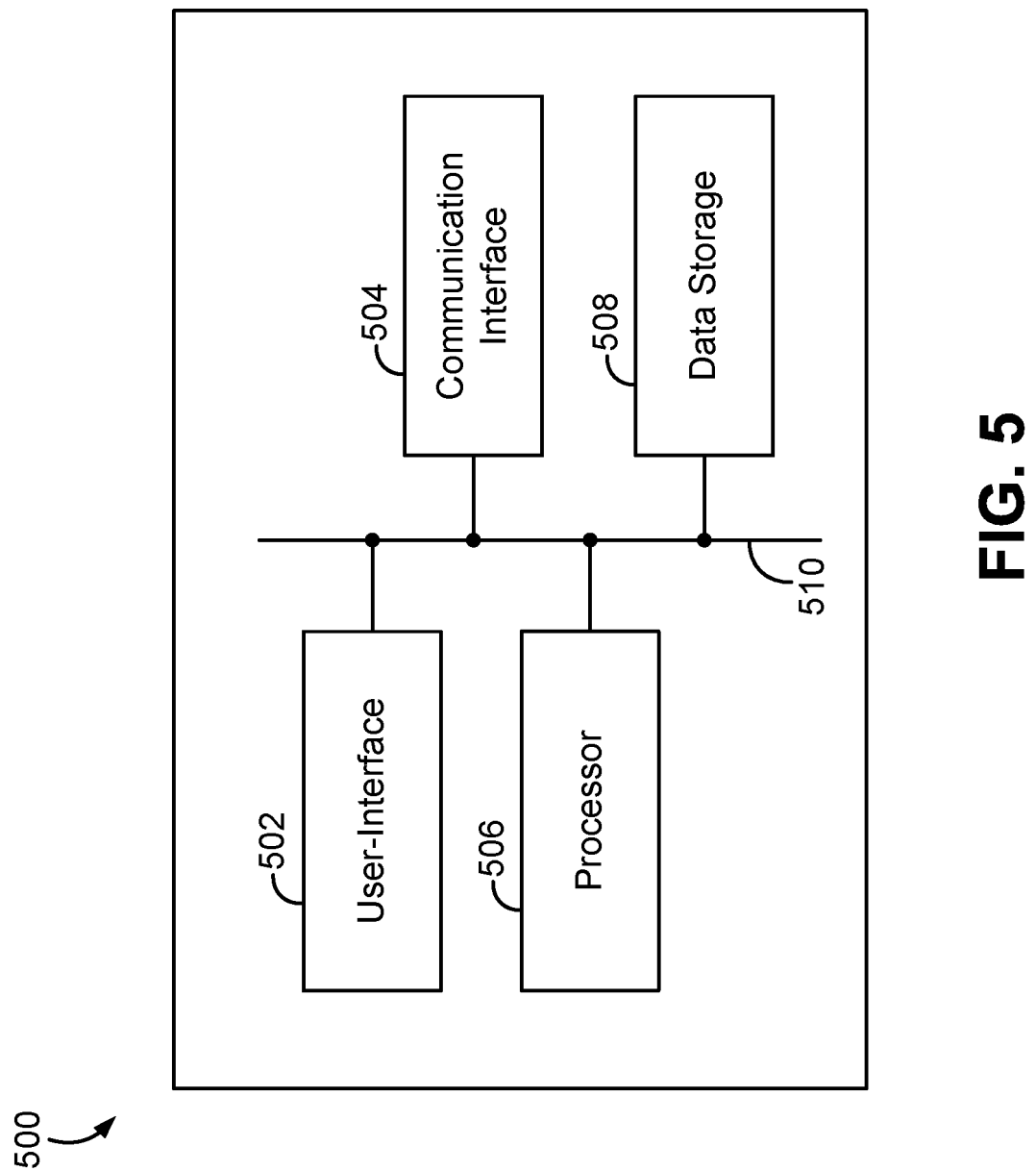
FIG. 5 is a simplified diagram of an example computing device.

FIG. 5 is a simplified block diagram of a device 500. The device 500 may take a variety of forms, including for example the scheduling system 402, the player controller 404, the data storage 406, one of the video players 408*a-c*, the streaming source 410, the router 412, the production switcher 414, the video wall controller 416, and/or the display panel computing devices 104*a-d*.

The device 500 may include various components, including for example, a user interface 502, a communication interface 504, a processor 506, and a data storage 508, all of which may be electronically connected to each other via a system bus or other connection mechanism 510. Note that the device 500 need not include all of these components and it may include additional components.

The user interface 502 may function to allow the device 500 to interact with a user, such as to receive input from a user and to provide output to the user. Thus, the user interface 502 may include input components such as a computer mouse, a keyboard, or a touch-sensitive panel. The user interface 502 may also include output components such as a display screen (which, for example, may be combined with a touch-sensitive panel) or a speaker. In some cases, the user interface 502 may be used by a producer or other personnel to provide inputs indicative of desired output media content on a video wall.

In some cases, the user interface 502 may be used by a producer or other personnel to provide for control of timing or synchronization of certain events performed in accordance with news program schedule entries. For instance, a producer (or director, etc.) may monitor events on a video production set, such as the readiness of other personnel for certain events to be performed and/or status indicators of various VPS sub-systems (which status indicators may be communicated using output components of the user interface 502). Once the producer judges that the conditions are ready for performance of a next event (or sequence of events) specified by one or more news program schedule entries, the producer can provide an input using the user interface 502 (e.g., by pressing a button). Upon receipt of data indicating the user input, the VPS can then perform the particular event(s). Such user inputs are therefore referred to herein as timing signals or initiation signals.

Moreover, in some cases events may be carried out following a predetermined delay after receipt of an initiation signal. Although in other examples, the VPS may perform events without regard to a user input. For instance, the VPS may perform a DVE and display resulting video content (or carry out another event) in response to associating a video program schedule entry (or entries) with those events. The time at which the VPS performs those events may be based on a predetermined absolute time (e.g., set by a reference clock that synchronizes VPS sub-systems), or may be based on a predetermined relative delay (e.g., a predetermined delay following execution of another event by the VPS).

The communication interface 504 may function to allow the device 500 to communicate with other devices (e.g., over the paths described above). The communication interface 504 may be configured to transmit and/or receive various types of data, including for example control data or video stream data. In one example, the communication interface 504 may take the form of a wired interface, such as an Ethernet port, USB port, or HD-SDI port. As another example, the communication interface 504 may take the form of a wireless interface, such as a WiFi interface. In either case, the communication interface 504 may include communication input and/or communication output interfaces.

The processor 506 may include one or more general purpose processors (e.g., microprocessors) and/or one or more special purpose processors (e.g., digital signal processors (DSPs), graphics processing unit (GPU), etc.). In an example, the GPU may be included in a video or graphics card of the device 500. The video card may also include a dedicated data storage unit.

The data storage 508 may include one or more volatile and/or non-volatile storage components, such as magnetic, optical, flash, or organic storage, and may be integrated in whole or in part with the processor 506. The data storage 508 may include removable and/or non-removable components. In some examples, the data storage 508 may include multiple storage drives that store data in a redundant and/or stripped configuration.

Generally, the processor 506 may be configured to execute program instructions (e.g., compiled or non-compiled program logic and/or machine code) stored in the data storage 508 to perform one or more of the functions described herein and/or shown in the accompanying drawings. As such, the data storage 508 may take the form of a non-transitory computer-readable storage medium, having stored thereon program instructions that, upon execution by the processor 506, cause the device 500 to perform one or more of the functions described herein and/or shown in the accompanying drawings.

VI. Example Operations

Figure 6:
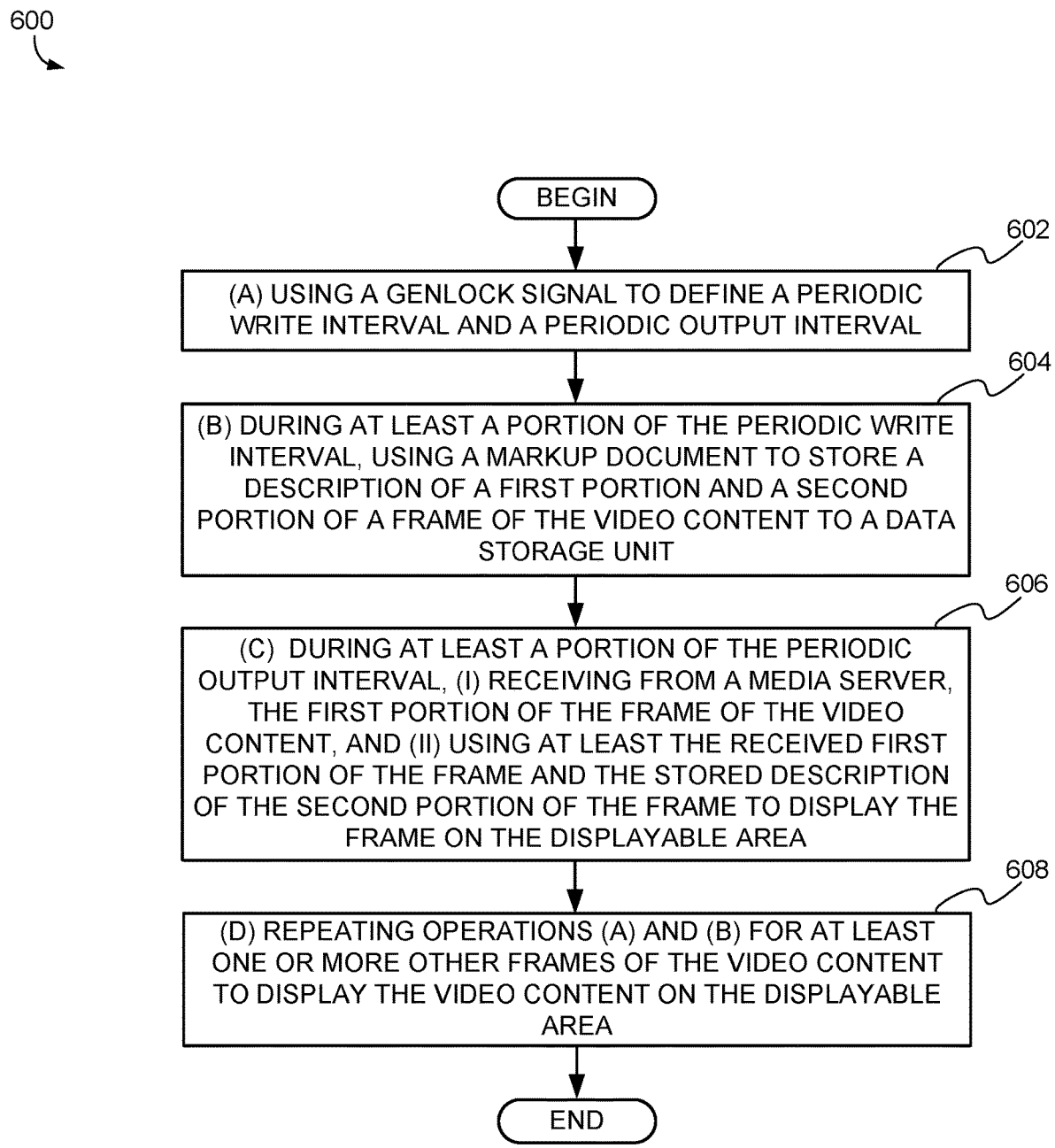
FIG. 6 is a flowchart of an example method that may be performed by video wall systems described herein.

FIG. 6 is a flowchart of an example method 600 for displaying content on displayable area that spans multiple panels of a multi-panel display. Method 600 is described by way of example as being implemented by the VWSs described herein. For example, the method 600 may be performed by VWS 100 described above in connection with FIG. 1 and/or the VPS 400 described above in connection with FIG. 4. However, it should be understood that method 600 could be implemented by other entities, other types of computing systems, or combinations of multiple computing systems, without departing from the scope of the invention.

At block 602, the method may involve (a) using a genlock signal to define a periodic write interval and a periodic output interval. For example, the genlock signal may be a video signal, and the periodic write interval and/or the periodic output interval may be defined based on a vertical blanking interval of the video signal.

At block 604, the method may involve (b) during at least a portion of the periodic write interval, using a markup document to store a description of a first portion and a second portion of a frame of the video content to a data storage unit. The first portion of the frame of the video content may be live video content and the second portion of the frame of the video content may be pre-recorded video content. The markup document may use layout descriptors to programmatically describe the content. Using a markup document to store a frame of content to a data storage unit may involve using a markup language to translate the layout descriptors into data vectors that describe the frame of the content, and storing the data vectors in the data storage unit.

In an implementation, a first subset of data vectors that describe the first portion of the frame (i.e., the live video content) may include an identifier of a media server that provides the live video content, position data indicative of a desired placement of the first portion of the frame on the displayable area, and/or a layer level of the live video content. Furthermore, each data vector that describes the pre-recorded content may include an RGB value of a respective pixel of the second portion of the frame.

At block 606, the method may involve (c) during at least a portion of the periodic output interval, (i) receiving from a media server, the first portion of the frame of the video content, and (ii) using at least the received first portion of the frame and the stored description of the second portion of the frame to display the frame on the displayable area. In particular, to receive the first portion of the frame from the media server, the method may involve reading from the data storage unit the first subset of data vectors that describes the first portion of the frame. The method may also involve based on the first subset of data vectors, identifying the media server, and determining a first portion of the displayable area to display the first portion of the frame, and then receiving from the media server a video stream that represents the first portion of the frame. The video stream can then be used to display the first portion of the frame on the first portion of the displayable area. In some examples, the first portion of the frame may be displayed on a subset of display panels. That is, each display panel of the subset may display a respective sub-portion of the first portion of the frame.

Further, using the stored description of the second portion of the frame to display the frame may involve reading from the data storage unit a second subset of data vectors that describes the second portion of the frame, where each data vector of the second subset of data vectors describes a respective pixel of the second portion of the frame. Then, a mapping of each data vector of the second subset of data vectors to a respective pixel of a second portion of the displayable area may be determined. Based on the mapping, the second portion of the displayable area may display the second portion of the frame.

In some examples, the live video content may be scaled. In particular, the method may involve based on the description of the first portion of the frame, determining a desired resolution of the first portion of the frame. Based on the desired resolution of the first portion of the frame and a resolution of the first portion of the frame represented by the video stream, the first portion of the frame represented by the video stream may be scaled. The scaled first portion of the frame and the stored description of the second portion of the frame may be used to display the frame on the displayable area.

In other examples, the first portion of the frame may include first live video content and second live video content. In such examples, the method may involve based on the description of the first portion of the frame, determining respective portions of the displayable area to display the first and second live video content, respectively, where the respective portions of the displayable area may overlap. Based on the description of the first portion of the frame, a first layer level and a second layer lever for the first live video content and the second live video content, respectively, may be determined. And based on the first layer level and the second layer level, the overlapping portion of the displayable area may display one of the first live video content and the second live video content.

At block 608, the method may involve (iv) repeating operations (ii) and (iii) for at least one or more other frames of the media content to output the media content on the displayable area. In particular, each frame of the media content may be stored to the data storage unit during a portion of a respective iteration of the periodic write interval, and each frame of the media content may be output during a portion of a respective iteration of the periodic output interval.

VII. Example Variations

While one or more functions have been described as being performed by certain devices or entities, the functions may be performed by any device or entity, such as those included in the VWS 100 or the VPS 400 described above.

Further, while examples of the disclosed method have been described in connection with a VPS, examples of the method may be implemented in other environments.

Also, the functions need not be performed in the disclosed order, although in some examples, an order may be preferred. And not all functions need to be performed to achieve the desired advantages of the disclosed system and method, and therefore not all functions are required.

It should also be noted that the variations described in connection with select examples of the disclosed system and method may be applied to all other examples of the disclosed system or method.

VIII. Conclusion

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A method of displaying video content on a displayable area that spans multiple panels of a multi-panel display, the method comprising:
   (a) using a genlock signal to define a periodic write interval and a periodic output interval;
   (b) during at least a portion of the periodic write interval, using a markup document to store a description of a first portion and a second portion of a frame of the video content to a data storage unit;
   (c) during at least a portion of the periodic output interval, (i) receiving from a media server, the first portion of the frame of the video content, and (ii) using at least the received first portion of the frame and the stored description of the second portion of the frame to display the frame on the displayable area; and
   (d) repeating operations (b) and (c) for at least one or more other frames of the video content to display the video content on the displayable area.

2. The method of claim 1, wherein the first portion of the frame includes live video content.

3. The method of claim 1, wherein the markup document uses a markup language to describe the video content, and wherein using a markup document to store a description of a first portion and a second portion of a frame of the video content to a data storage unit comprises:

translating, using the markup language, the markup document into a plurality of data vectors that describe the frame of the video content; and
storing the data vectors in the data storage unit.

4. The method of claim 3, wherein a first subset of data vectors describes the first portion of the frame.

5. The method of claim 4, wherein the first subset of data vectors comprises an identifier of the media server.

6. The method of claim 4, wherein the first subset of data vectors comprises position data indicative of a desired placement of the first portion of the frame on the displayable area.

7. The method of claim 4, wherein the first subset of data vectors comprises a layer level of the first portion of the frame.

8. The method of claim 3, wherein (i) receiving from a media server, the first portion of the frame of the video content, and (ii) using at least the received first portion of the frame and the stored description of the second portion of the frame to display the frame on the displayable area comprises:
   reading from the data storage unit a first subset of data vectors that describes the first portion of the frame;
   based on the first subset of data vectors, identifying the media server, and determining a first portion of the displayable area to display the first portion of the frame;
   receiving from the media server a video stream that represents the first portion of the frame; and
   using the video stream to display the first portion of the frame on the first portion of the displayable area.

9. The method of claim 8, wherein the first portion of the displayable area spans a subset of display panels, and wherein using at least the received first portion of the frame and the stored description of the second portion of the frame to display the frame on the displayable area further comprises:
   causing each of the subset of display panels to display a respective portion of the first portion of the frame.

10. The method of claim 8, wherein using at least the received first portion of the frame and the stored description of the second portion of the frame to display the frame on the displayable area further comprises:
   reading from the data storage unit a second subset of data vectors that describes the second portion of the frame, wherein each data vector of the second subset of data vectors describes a respective pixel of the second portion of the frame;
   determining a mapping of each data vector of the second subset of data vectors to a respective pixel of a second portion of the displayable area; and
   based on the mapping, causing the second portion of the displayable area to display the second portion of the frame.

11. The method of claim 1, wherein the first portion of the frame comprises first live video content and second live video content, and wherein the method further comprises:
   based on the description of the first portion of the frame, determining a first portion and a second portion of the displayable area to display the first and second live video content, respectively, wherein the first portion of the displayable area and the second portion of the displayable area overlap in a third portion of the displayable area;

based on the description of the first portion of the frame, determining a first layer level and a second layer lever for the first live video content and the second live video content, respectively; and based on the first layer level and the second layer level, causing the third portion of the displayable area to display one of the first live video content and the second live video content.

12. The method of claim 1, wherein (i) receiving from a media server, the first portion of the frame of the video content, and (ii) using at least the received first portion of the frame and the stored description of the second portion of the frame to display the frame on the displayable area comprises:

based on the description of the first portion of the frame, determining a desired resolution of the first portion of the frame;

based on the desired resolution of the first portion of the frame and a resolution of the first portion of the frame as received from the media server, scaling the first portion of the frame received from the media server; and using at least the scaled first portion of the frame and the stored description of the second portion of the frame to display the frame on the displayable area.

13. The method of claim 1, wherein each frame of the video content is stored to the data storage unit during a portion of a respective iteration of the periodic write interval, and wherein each frame of the video content is output during a portion of a respective iteration of the periodic output interval.

14. A video wall system comprising:
a multi-panel display comprising a plurality of display panels;
a data storage unit; and
a controller having one or more processors and memory storing instructions that, when executed by the one or more processors, cause the system to carry out operations including:
(a) using a genlock signal to define a periodic write interval and a periodic output interval;
(b) during at least a portion of the periodic write interval, using a markup document to store a description of a first portion and a second portion of a frame of video content to the data storage unit;
(c) during at least a portion of the periodic output interval, (i) receiving from a media server, the first portion of the frame of the video content, and (ii) using at least the received first portion of the frame and the stored description of the second portion of the frame to display the frame on a displayable area of the multi-panel display; and
(d) repeating operations (b) and (c) for at least one or more other frames of the video content to display the video content on the displayable area.

15. The system of claim 14, wherein the markup document uses a markup language to describe the video content, and wherein using a markup document to store a description of a first portion and a second portion of a frame of the video content to a data storage unit comprises:
using the markup language to translate the markup document into a plurality of data vectors that describe the frame of the video content; and
storing the data vectors in the data storage unit.

16. The system of claim 15, wherein the system further comprises a plurality of computing devices, wherein each computing device is coupled to a respective one of the plurality of display panels, and wherein (i) receiving from a media server, the first portion of the frame of the video content, and (ii) using at least the received first portion of the frame and the stored description of the second portion of the frame to display the frame on the displayable area comprises:

each computing device reading from the data storage unit the data vectors that describe the video content, and determining a mapping of the data vectors to the display panels;

based on the mapping, a first subset of the plurality of computing devices determining that a first subset of data vectors that describe the first portion of the frame are mapped to a first subset of display panels that are coupled to the first subset of computing devices;

based on the first subset of data vectors, the first subset of computing devices selecting the media server to each receive a multicast stream that represents the first portion of the frame; and the first subset of computing devices using the multicast stream to cause the first subset of display panels to display the first portion of the frame.

17. The system of claim 16, wherein using at least the stored description of the second portion of the frame and the received first portion of the frame to display the frame on the displayable area further comprises:

each computing device retrieving from the data storage unit a second subset of data vectors that describes the second portion of the frame, wherein each data vector of the second subset of data vectors describes a respective pixel of the second portion of the frame;

based on the mapping of the data vectors to the display panels, a second subset of computing devices determining that the second subset of data vectors are mapped to a second subset of display panels that are coupled to the second subset of computing devices; and the second subset computing devices causing the second subset of display panels to display the second portion of the frame.

18. The system of claim 16, wherein determining a mapping of the data vectors to the display panels comprises:
using a two-dimensional (2D) space descriptor document to determine the mapping of the data vectors to the display panels.

19. The system of claim 14, wherein each frame of the video content is stored to the data storage unit during a portion of a respective iteration of the periodic write interval, and wherein each frame of the video content is output during a portion of a respective iteration of the periodic output interval.

20. A non-transitory computer-readable storage medium having stored thereon program instructions that when executed by a processor cause performance of a set of acts comprising:
(a) using a genlock signal to define a periodic write interval and a periodic output interval;
(b) during at least a portion of the periodic write interval, using a markup document to store a description of a first portion and a second portion of a frame of video content to a data storage unit, wherein a multi-panel display is configured to display the video content, and wherein the multi-panel display comprises a displayable area that spans multiple display panels;
(c) during at least a portion of the periodic output interval, (i) receiving from a media server, the first portion of the frame of the video content, and (ii) using at least the received first portion of the frame and the stored description of the second portion of the frame and to display the frame on the displayable area; and (d) repeating operations (b) and (c) for at least one or more other frames of the video content to display the video content on the displayable area.

\* \* \* \* \*